United States Patent
Mochizuki

(10) Patent No.: US 7,206,328 B2
(45) Date of Patent: Apr. 17, 2007

(54) SONET/SDH TRANSMISSION CONTROL DEVICE

(75) Inventor: Hideaki Mochizuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 839 days.

(21) Appl. No.: 10/095,857

(22) Filed: Mar. 12, 2002

(65) Prior Publication Data

US 2003/0053494 A1   Mar. 20, 2003

(30) Foreign Application Priority Data

Sep. 19, 2001   (JP)   ............................. 2001-285374

(51) Int. Cl.
*H04J 3/04*   (2006.01)
(52) U.S. Cl. .................................... 370/537
(58) Field of Classification Search ................ 370/464, 370/532–549, 907
See application file for complete search history.

(56) References Cited

U.S. PATENT DOCUMENTS

| | | | | |
|---|---|---|---|---|
| 4,967,405 A | * | 10/1990 | Upp et al. ..................... | 398/50 |
| 5,040,170 A | * | 8/1991 | Upp et al. ..................... | 398/50 |
| 5,282,195 A | * | 1/1994 | Hood et al. ................... | 370/378 |
| 5,331,630 A | * | 7/1994 | Fujita et al. .................. | 370/351 |
| 5,428,612 A | * | 6/1995 | Scheffel et al. ............... | 370/468 |
| 5,651,034 A | * | 7/1997 | Oksanen et al. ............. | 375/372 |
| 5,666,351 A | * | 9/1997 | Oksanen et al. ............. | 370/474 |
| 5,687,318 A | * | 11/1997 | Oksanen et al. ............. | 709/234 |
| 5,706,299 A | * | 1/1998 | Baydar et al. ............... | 714/822 |
| 5,717,693 A | * | 2/1998 | Baydar et al. .............. | 370/514 |
| 5,754,545 A | | 5/1998 | Shinbashi et al. | |
| 6,157,658 A | | 12/2000 | Toyoyama et al. | |
| 6,628,651 B1 | * | 9/2003 | Ryan et al. .................. | 370/369 |

FOREIGN PATENT DOCUMENTS

| | | |
|---|---|---|
| JP | 8-237215 | 9/1996 |
| JP | 10-028102 | 1/1998 |
| JP | 2000-049734 | 2/2000 |
| JP | 2000-324076 | 11/2000 |

OTHER PUBLICATIONS

Japanese Office Action dated Mar. 28, 2006 with translation.

* cited by examiner

*Primary Examiner*—Dmitry Levitan
(74) *Attorney, Agent, or Firm*—Katten Muchin Rosenman LLP

(57) ABSTRACT

A transmission device far efficient synchronous multiplexing control for downsizing and reducing power consumption. A count control performs channel management control on a cross-connect basis using count control of channels of high-bit-rate and low-bit-rare multiplexing unit signals. A part which detects a head position of path information based on pointer value. A part which performs clock exchange with respect to valid path information indicated by head position. A part which generates a write count value, a read count value, and adds a pointer to the valid path information read. A cross-connect circuit uses two-plane memory, and cross-connects a signal with the pointer being replaced by memory reading based on memory switch information.

10 Claims, 17 Drawing Sheets

FIG. 13

| | | | | | | | | | | | | | | | | |
|---|---|---|---|---|---|---|---|---|---|---|---|---|---|---|---|---|
| INPUT DATA | VT 16 | VT 17 | VT 18 | VT 19 | VT 20 | VT 21 | VT 22 | D | E | A | B | C | VT 28 | VT 29 | VT 30 | VT 31 | VT 32 |
| STS COUNTER (WRITE) | 3 | 4 | 5 | 6 | 7 | 8 | 9 | 10 | 11 | 0 | 1 | 2 | 3 | 4 | 5 | 6 | 7 |
| VT COUNTER (WRITE) | 27 | 28 | 29 | 30 | 31 | 32 | 33 | 34 | 35 | 36 | 37 | 38 | 39 | 40 | 41 | 42 | 43 |
| CHANNEL SETTING DATA | 20 | 21 | 27 | 28 | 29 | 9 | 11 | 10 | 2 | 1 | 0 | 30 | 31 | 32 | 33 | 4 | 3 |
| STS COUNTER (READ) | 10 | 11 | 0 | 1 | 2 | 3 | 4 | 5 | 6 | 7 | 8 | 9 | 10 | 11 | 0 | 1 | 2 |
| VT COUNTER (READ) | 22 | 23 | 24 | 25 | 26 | 27 | 28 | 14 | 15 | 16 | 17 | 18 | 19 | 20 | 21 | 22 | 23 |
| MEMORY M1 ADDRESS | 20 | 21 | 27 | 28 | 29 | 9 | 11 | 10 | 2 | 0 | 1 | 2 | 31 | 32 | 33 | 4 | 3 |
| MEMORY M2 ADDRESS | 27 | 28 | 29 | 30 | 31 | 32 | 33 | 10 | 11 | 1 | 0 | 30 | 39 | 40 | 41 | 42 | 43 |
| OUTPUT DATA | VT 9 | VT 10 | VT 16 | VT 17 | VT 18 | VT 334 | E | D | C | B | A | VT 19 | VT 20 | VT 21 | VT 22 | VT 329 | VT 328 |

STS/VT SEL: VT — STS — VT

SONET/SDH TRANSMISSION CONTROL DEVICE

BACKGROUND OF THE INVENTION (1) Field of the Invention

The present invention relates to transmission devices, and more particularly, to a transmission device that performs a multiplexing transmission control in SONET (Synchronous Optical Network)/SDH (Synchronous Digital Hierarchy).

(2) Description of the Related Art

As is known, SDH/SONET has been standardized as a signal hierarchy multiplexing system in digital transmission, and development of economical digital networks has been progressed. A further progress of multimedia networks has been expected.

FIG. 17 is a schematic block diagram of a conventional synchronous multiplexing transmission device. A synchronous multiplexing transmission device 100 is arranged in a SONET/SDH network, and is made up of a processing selection part 101, a demapping part 102, cross-connect parts 103, 104, a mapping part 105, and an output selector 106. The following description is directed to the transmission device 100 that is designed to work on SONET.

The processing selection part 101 receives an STS-n (Synchronous Transport Signal: n denotes n times of STS-1), and determines whether the received signal should be cross-connected as STS stands or should be converted into a VT (Virtual Tributary) before cross-connection. Then, the received is output to one of the two routes on the basis of the determination result.

The demapping part 102 converts the received STS signal into low bit rate VT signals by demapping (high-to-low bit rate changing). The cross-connect part 103 makes cross-connecting on the VT basis, and the cross-connect part 104 makes cross-connecting on the STS basis.

The mapping part 105 maps VT signals from the cross-connect part 103 to yield an STS signal (low-to-high bit rate changing). The output selector 106 selects either the STS signal that has been cross-connected on the VT basis or the STS signal that has been cross-connected on the STS basis.

The synchronous multiplexing transmission device 100 separately processes the STS signal and VT signal. This increases the circuit scale and power consumption and prevents downsizing.

Recently, the backbone networks have a huge capacity due to an increased demand along with wide spreading of Internet, and the transmission device has been strictly required to have an increased integration density, an increased transmission capacity and advanced functions. It is increasingly important to make an effort on further downsizing and reduction in power consumption in circuit design.

SUMMARY OF THE INVENTION

Taking the above into consideration, an object of the present invention is to provide a transmission device capable of efficiently synchronous multiplexing control for downsizing and reduction in power consumption, so that transmission quality can be improved.

The above object of the present invention is achieved by a transmission device performing multiplexing transmission control comprising: a pointer replacement circuit including a count control part generating a count value by commonly using a count control of channels of a high-bit-rate multiplexing unit signal and those of a low-bit-rate multiplexing unit signal and performing a channel management control on the basis of specific information of the high-bit-rate multiplexing unit signal and the low-bit-rate multiplexing unit signal on a cross-connect basis, a head position detecting part detecting a head position of path information based on a pointer value, a clock exchange memory part receiving a write/read control with respect to valid path information indicated by the head position and performing clock exchange, a write counter generating a write count value for the clock exchange memory part, a read counter generating a read count value for the clock exchange memory part, and a pointer adding part adding a pointer of the high-bit-rate multiplexing unit signal or the low-bit-rate multiplexing unit signal to the valid path information read; and a cross-connect circuit including a memory control part having a two-plane memory storing a signal with the pointer being replaced, a memory switch part generating memory switch information used for switching the planes of the memory on the basis of the count value, and an address generating part generating a write address and a read address of the memory on the basis of the count value.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 13 is a timing chart of the operation of the cross-connect circuit;

DESCRIPTION OF THE PREFERRED EMBODIMENTS

A description will now be given of preferred embodiments of the present invention with reference to the accompanying drawings.

Figure 1:
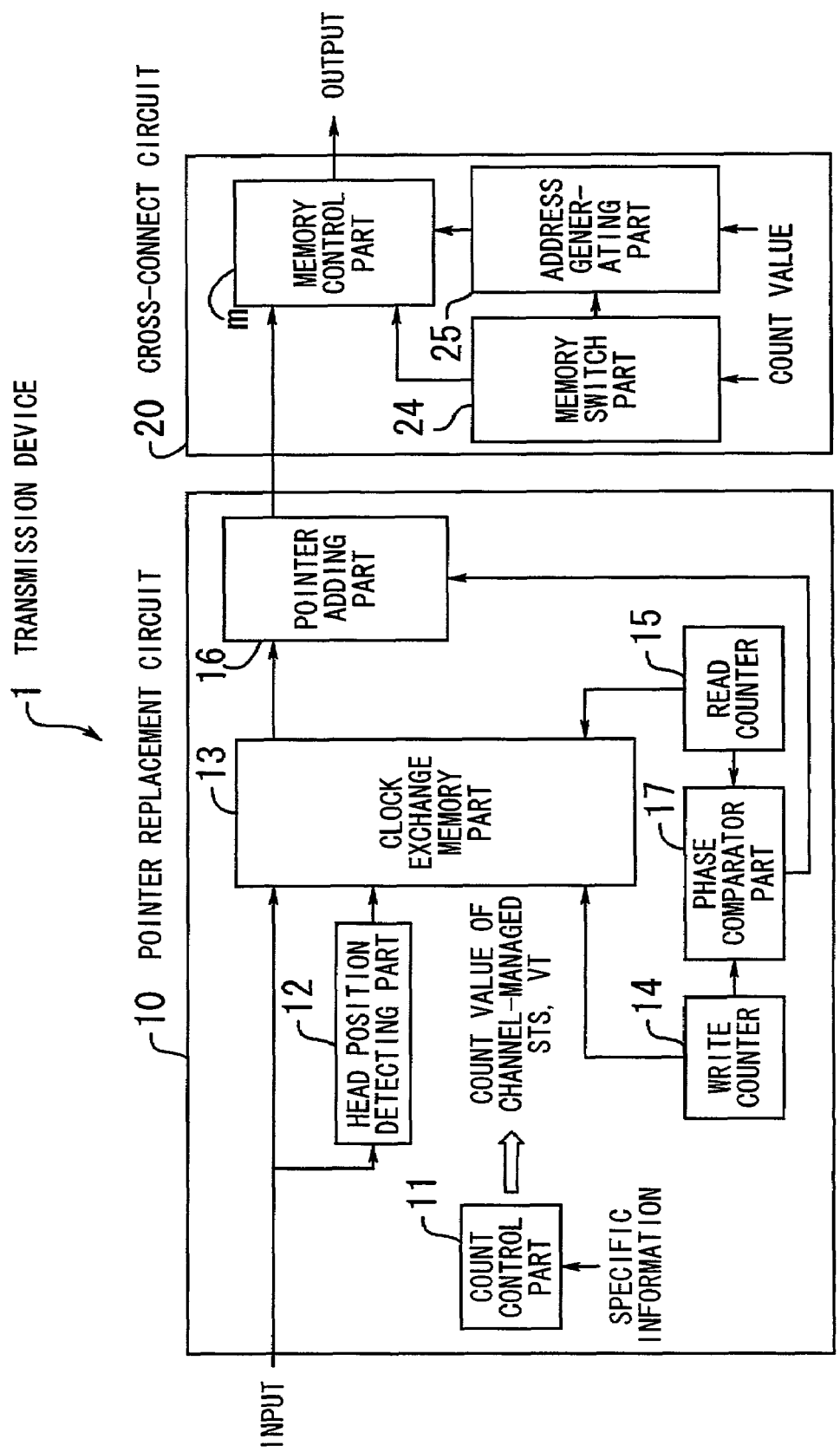
FIG. 1 is a block diagram of the principles of a transmission device of the present invention.

FIG. 1 is a block diagram illustrating the principles of a transmission device according to the present invention. A transmission device 1 of the invention includes a pointer replacement circuit 10 and a cross-connect circuit 20, and performs synchronous multiplexing transmission control in SONET/SDH. In the following, a description of the transmission device 1 is primarily directed to SONET.

The pointer replacement circuit 10 is made up of a count control part 11, a head position detecting part 12, a clock exchange memory part 13, a write counter 14, a read counter 15, a pointer adding part 16, and a phase comparator part 17.

The count control part 11 commonly performs count control of channels of a high-bit-rate multiplexing unit signal (hereinafter, STS signal) and channels of a low-bit-rate multiplexing unit signal (hereinafter, VT signal) to yield a count value. The count control part 11 performs a channel management control on the basis of information concerning the STS and VT signals designated on the cross-connect basis. The channel-managed count value is supplied to a corresponding circuit.

The head position detecting part 12 refers to the pointer value of the STS signal or the VT signal and detects the head position of path information (detection of the originating point of Synchronous Payload Envelope (SPE)). The clock exchange memory part 13 may, for example, be of an elastic memory, and shares the area into which the STS signal or the VT signal is stored. The clock exchange memory part 13 exchanges the clock by write/read control with respect to valid path information indicated by the head position.

The write counter 14 generates a write count value of the clock exchange memory part 13. The read counter 15 generates a read count value of the clock exchange memory part 13.

The pointer adding part 16 adds the pointer of the STS signal or the VT signal to the valid path information that is read from the clock exchange memory part 13, so that the beginning channels can be aligned for cross-connection made in the following stage. The phase comparator part 17 compares the write count value of the write counter 14 and the read count value of the read counter 15 with each other, and performs stuffing control based on the difference.

The cross-connect circuit 20 is made up of a memory control part m, a memory switch part 24, and an address generating part 25. The cross-connect circuit 20 uses the count value of the channels of the STS signal and the count value of the channels of the VT signal as a two-plane memory address. The cross-connect circuit 20 makes a cross-connection the signal with its pointer replaced on the basis of the memory switch information.

When the transmission device 1 is applied to SDH, the high-bit-rate multiplexing unit signal is STM, and the low-bit-rate multiplexing unit signal is TU.

Next, a description will be given of a signal format and the outline of pointers. In SONET/SDH, multiplexing control uses a standardized multiplexing unit called VC (Virtual Container). The VC employs byte multiplexing. By adding a pointer that indicates the time difference in frame phase of multiplexing information in the form of address, a VT is generated in SONET (TU (Tributary Unit) for SDH). An STS-1 frame (51.84 Mbps) is constructed by multiplexing 28 channels of VT1.5's. The STS-1 frame is the basic unit in SONET. The frame of the basic unit in SDH is an STM (Synchronous Transport Module)-1: 155.52 Mbps. Generally, the following relation stands: STS-3×n=STM-n.

Figure 2:
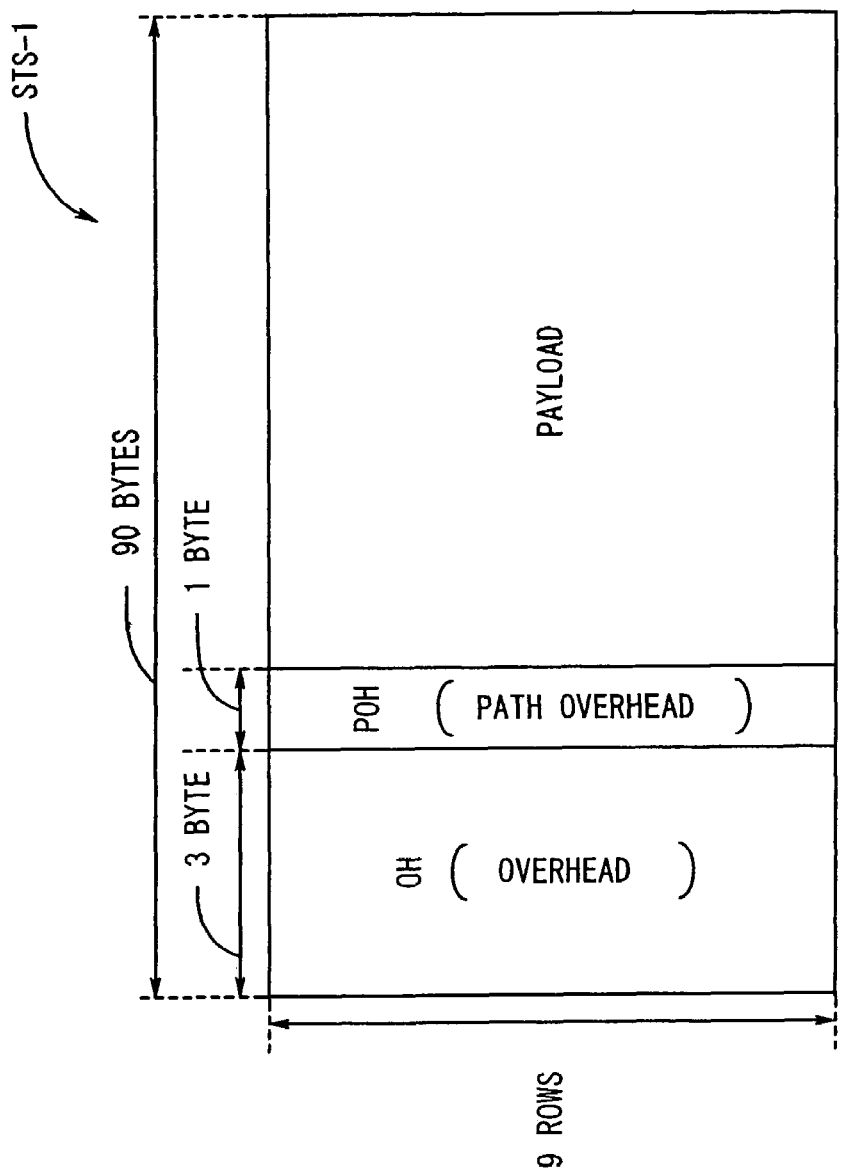
FIG. 2 is a view of an STS-1 format.

FIG. 2 shows the STS-1 frame format, which has 9 rows, each consisting of 90 bytes. In each row, three bytes on the left side of the STS-1 frame are used as an overhead (OH) field, and 87 bytes except POH (Path Overhead) on the right side thereof are used as a payload, in which user data may be placed. The combination of POH and payload is called SPE (Synchronous Payload Envelope).

In SONET/SDH, full synchronization is established within the network by using an address value called pointer. Now, a description will be given, with reference to FIG. 3, of an outline of the pointer function wherein STS-3 is taken for instance.

Figure 3:
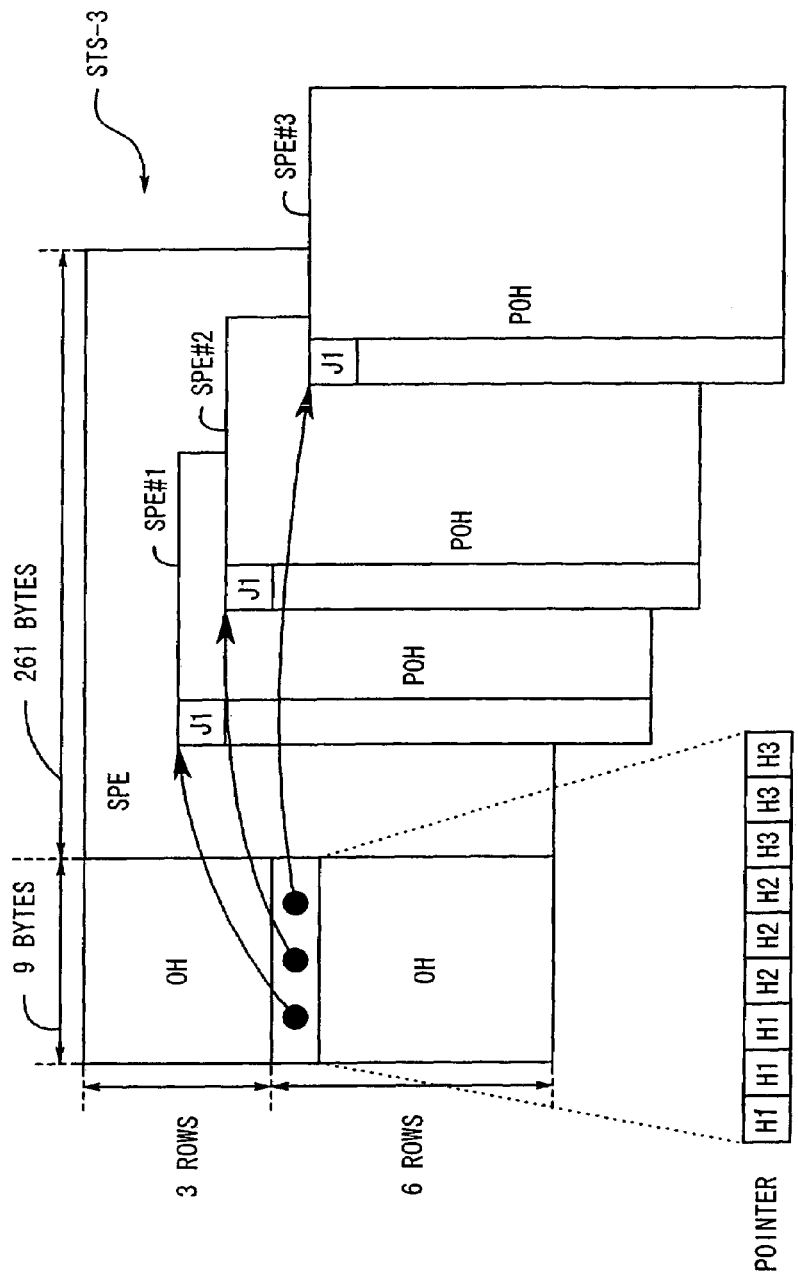
FIG. 3 is a view of a head indicating function of a pointer for an example of STS-3.

FIG. 3 shows a head indicative function of the pointer for STS-3. The STS-3 frame is expressed by a two-dimensional byte arrangement that consists of 9 rows and 270 columns. The first nine rows and nine columns form an OH (the pointer is arranged in the fourth column), and nine rows and 261 columns subsequent thereto form an SPE in which multiplexing information is accommodated.

SPE#1, SPE#2 and SPE#3 except the OH of the STS-1 that has been described with reference to FIG. 2 are multiplexed in the payload of the STS-3 frame. The pointer value consisting of H1#n, H2#n (n=1, 2, 3) indicates the position (address) of the J1 byte (the head byte of SPE) of SPE#n (n=1, 2, 3).

There is a frequency adjustment function as another pointer function. If there is a fine difference in the clock frequency of the multiplexing information, an H3#n (n=1, 2, 3) byte is used for stuffing control (one-bit-based add/drop) in order to prevent transport information from being lost.

In the above-mentioned manner, in SONET/SDH, the head position of the low-bit-rate information can be immediately identified by the pointer value. In addition, the stuffing control for allowing a phase variation of the frequency can be performed efficiently.

The transmission device 1 of the invention performs a pointer replacement process (the received pointer value→sent pointer value) and a cross-connect process (channel gathering/separating process) so that the transport signal can be changed to the interface condition of the target device.

Figure 4:
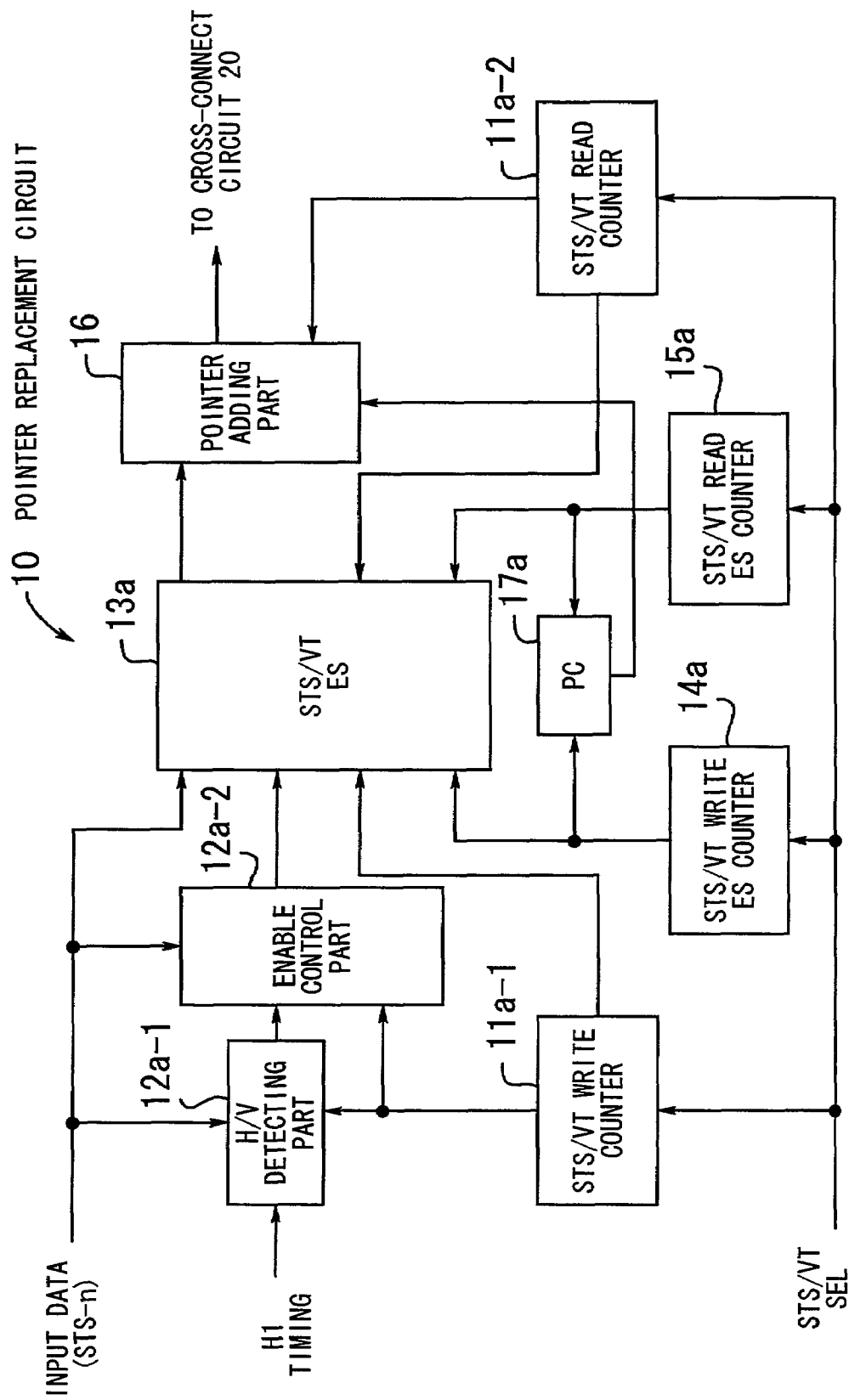
FIG. 4 is a block diagram of a pointer replacement circuit.

The pointer replacement circuit 10 is described below. FIG. 4 is a block diagram of a configuration of the pointer replacement circuit 10. This circuit 10 is made up of an STS/VT write counter 11a-1, an STS/VT read counter 11a-2, a leading position detecting part 12a-1, an enable control part 12a-2, an STS/VT Elastic Store Memory (ES) 13a, an STS/VT write ES counter 14a, an STS/VT read ES counter 15a, a pointer adding part 16, and a Phase Comparator (PC) 17a.

The STS/VT write counter 11a-1 and the STS/VT read counter 11a-2 correspond to the count control part 11. The H/V detecting part 12a-1 and the enable control part 12a-2 correspond to the head position detecting part 12. The STS/VT ES 13a corresponds to the clock exchange memory part 13. The STS/VT write ES counter 14a corresponds to the write counter 14. The STS/VT read ES counter 15a corresponds to the read counter 15. The PC 17a corresponds to the phase comparator part 17.

Figure 5:
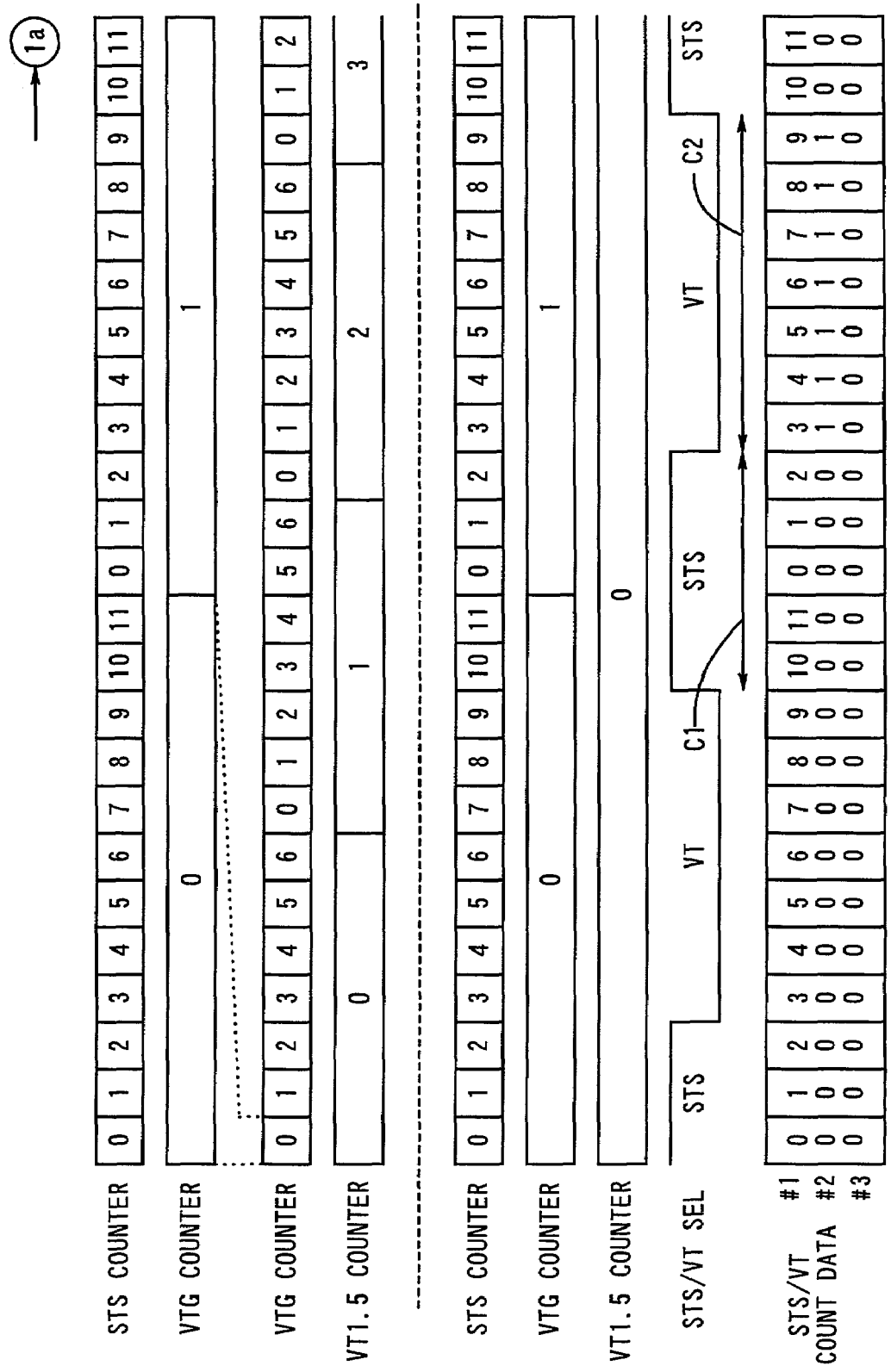
FIG. 5 is a timing chart of an operation of a count control part.
Figure 6:
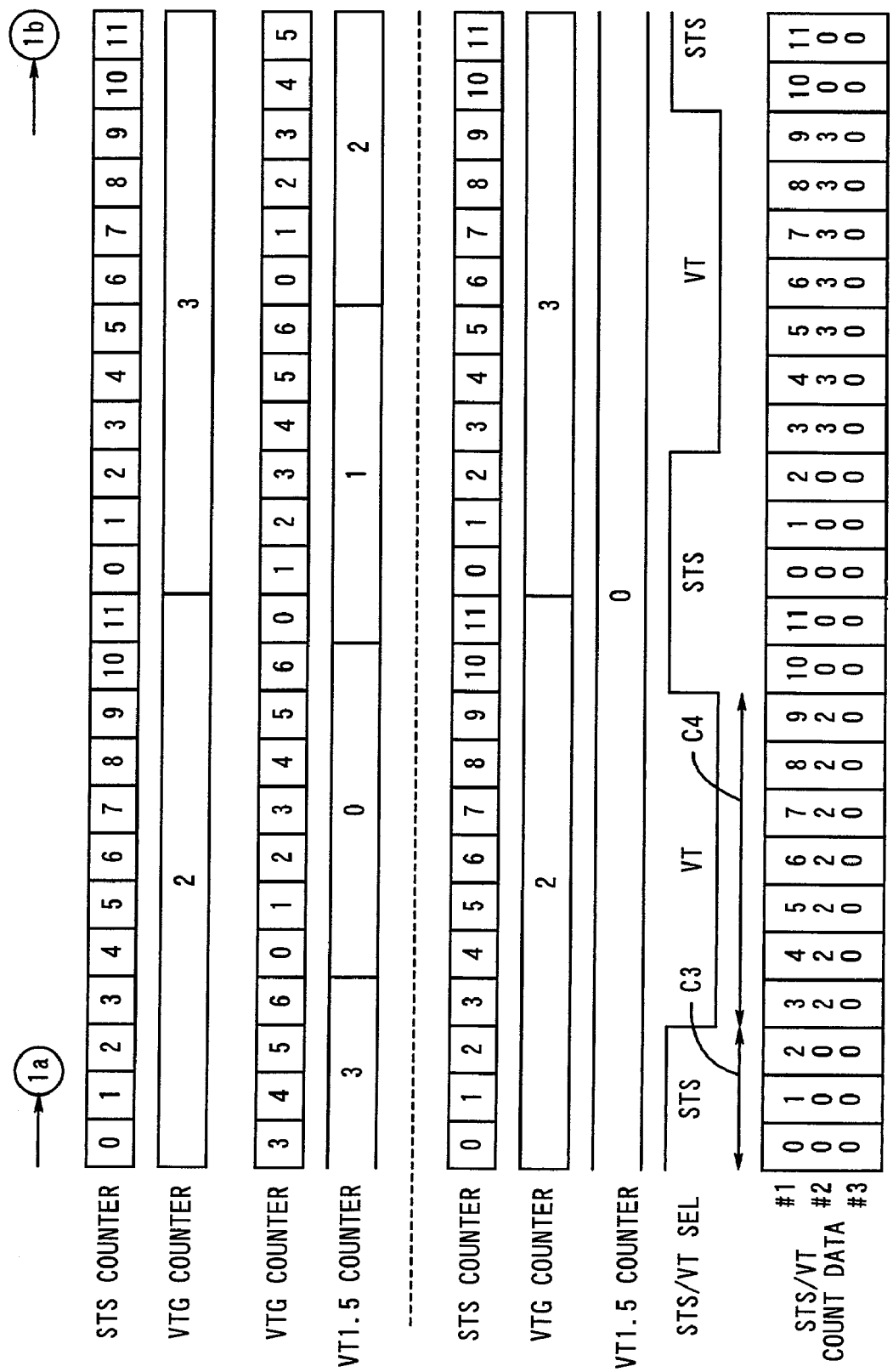
FIG. 6 is a timing chart of the operation of the count control part.
Figure 7:
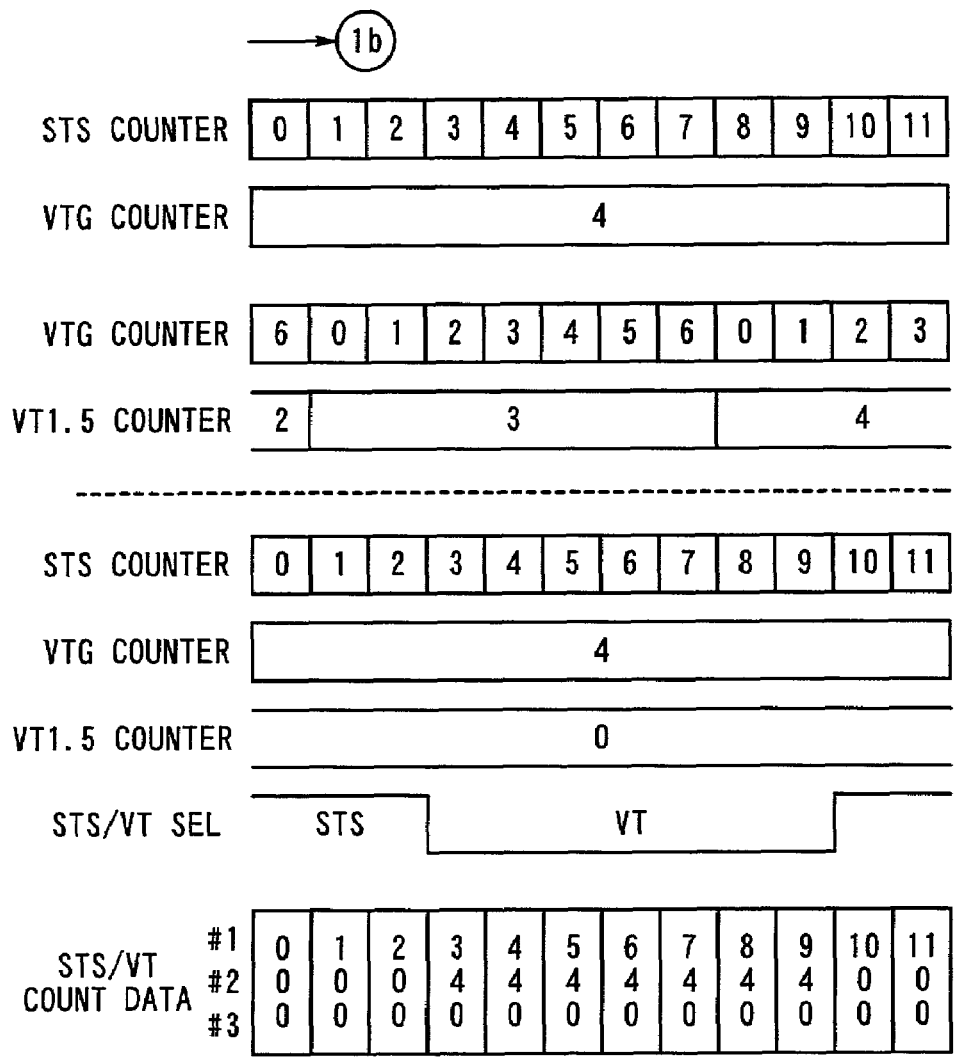
FIG. 7 is a timing chart of the operation of the count control part.

The STS/VT write counter 11a-1 and the STS/VT read counter 11a-2 manage the channels of the STS signal and the VT signal on the input and output sides of the pointer replacement circuit 10 (the details thereof will be described later with reference to FIGS. 5 through 7). The count value of the STS/VT write counter 11a-1 is sent to the H/V detecting part 12a-1, the enable control part 12a-2 and the STS/VT ES 13a. The count value of the STS/VT read counter 11a-2 is sent to the pointer adding part 16 and the STS/VT ES 13a.

The H/V detecting part 12a-1 receives input data (STS-n) and H1 timing (timing signal indicating the position of H1), and detects H1, H2, V1 and V2 (H2, V1 and V2 are automatically detectable when H1 is detected). Then, the H/V detecting part 12a-1 detects the leading position of path information of STS (SPE of STS) and path information of VT (SPE of VT) respectively mapped in the STS signal and the VT signal.

The enable control part 12a-2 generates a timing signal indicating the head position of the path information by referring to the detection result of the H/V detecting part 12a-1, and sends it to the STS/VT ES 13a as an enable signal of SPE.

The STS/VT write ES counter 14a and the STS/VT read ES counter 15a are counters that generates addresses for writing and reading the signal with respect to the STS/VT ES 13a for clock exchange.

The PC 17a compares the read/write count values of the STS/VT write ES counter 14a and the STS/VT read ES counter 15a, and generates a stuffing request signal based on the comparison result. The stuffing request signal is then sent to the pointer adding part 16.

The pointer adding part 16 performs stuffing control in response to the stuffing request signal by adding the new pointer to the signal with its bit rate changed by the STS/VT ES 13a, the signal being sent to the cross-connect circuit 20.

STS/VT SELect signal (SEL) is information that designates the STS signal or the VT signal on the cross-connect basis, and indicates whether the STS signal or the VT signal that should be cross-connected by the cross-connect circuit 20 is the STS signal. The STS/VT SEL is sent to each counter in the pointer replacement circuit 10.

Next, a description will be given of the operation of the count control part 11 (STS/VT write counter 11a-1 and STS/VT read counter 11a-2). FIGS. 5 through 7 are respectively timing charts of the count control part 11. The following description is directed to STS-12.

An STS counter, a VTG counter and a VT1.5 counter are the names of the counter functions that the count control part 11 has. When the STS counter counts from 0 to 11, the VTG counter is incremented by 1. The VTG counter counts from 0 to 6, the VT1.5 counter is incremented by 1. The VT1.5 counter counts from 0 to 3.

The count values of the STS counter, VTG counter and VT1.5 counter obtained when the VT1.5 counter indicates 0 are picked up below a broken line in each of FIGS. 5 through 7.

The STS/VT count data is an output count value based on STS/VT SEL, and is sent to the H/V detecting part 12a-1, the enable control part 12a-2, the pointer adding part 16 and the STS/VT ES 13a.

The value of #1 of the STS/VT count data is the count value of the STS counter, and the value of #2 is the count value of the VTG counter, the value of #3 being the count value of the VT1.5. In practice, the count value of #1 of the STS counter consists of four bits, and the count value of #2 of the VTG counter consists of three bits, the count value of #3 of the VT1.5 counter consisting of 2 bits. A single piece of STS/VT count data is expressed by nine bits.

The count values of the STS counter and the VT1.5 counter are used as parts #1 and #3 of the STS/VT count data as they are, while part #2 varies based on STS/VT SEL. More particularly, the VTG counter indicates 0 when the STS/VT SEL indicates the STS section, and indicates the count value of the VTG counter obtained at that time when the STS/VT SEL indicates the VT section.

For instance, the values of part #2 are all 0 in section C1 (STS section), and are all 1 in the next section C2 (VT section). The values of part #2 are all 0 in section C3 (STS section), and are all 2 in the next section C4 (VT section).

Thus, when the STS/VT count data is used as an address, the count value of the VTG is always 0 for STS. Therefore, by using the count value of the VTG as an upper address, it is possible to efficiently separate the address zone into the address for STS channel management and the address for VT channel management.

More particularly, the address for the STS channel management has a space that is expressed by four bits of the STS counter and three bits of the VT1.5 counter in which the upper address is 0. The address for the VT channel management has a space that is expressed by four bits of the STS counter, three bits of the VTG counter and two bits of the VT1.5 counter (this is apparently implemented by a small capacity memory for the STS signal).

By commonly using the count control for STS and VT, it is possible to efficiently perform the channel management control. This does not need separate processing of STS and VT in the H/V detecting part 12a-1, the enable control part 12a-2, the pointer adding part 16 and the STS/VT ES 13a.

Figure 8:
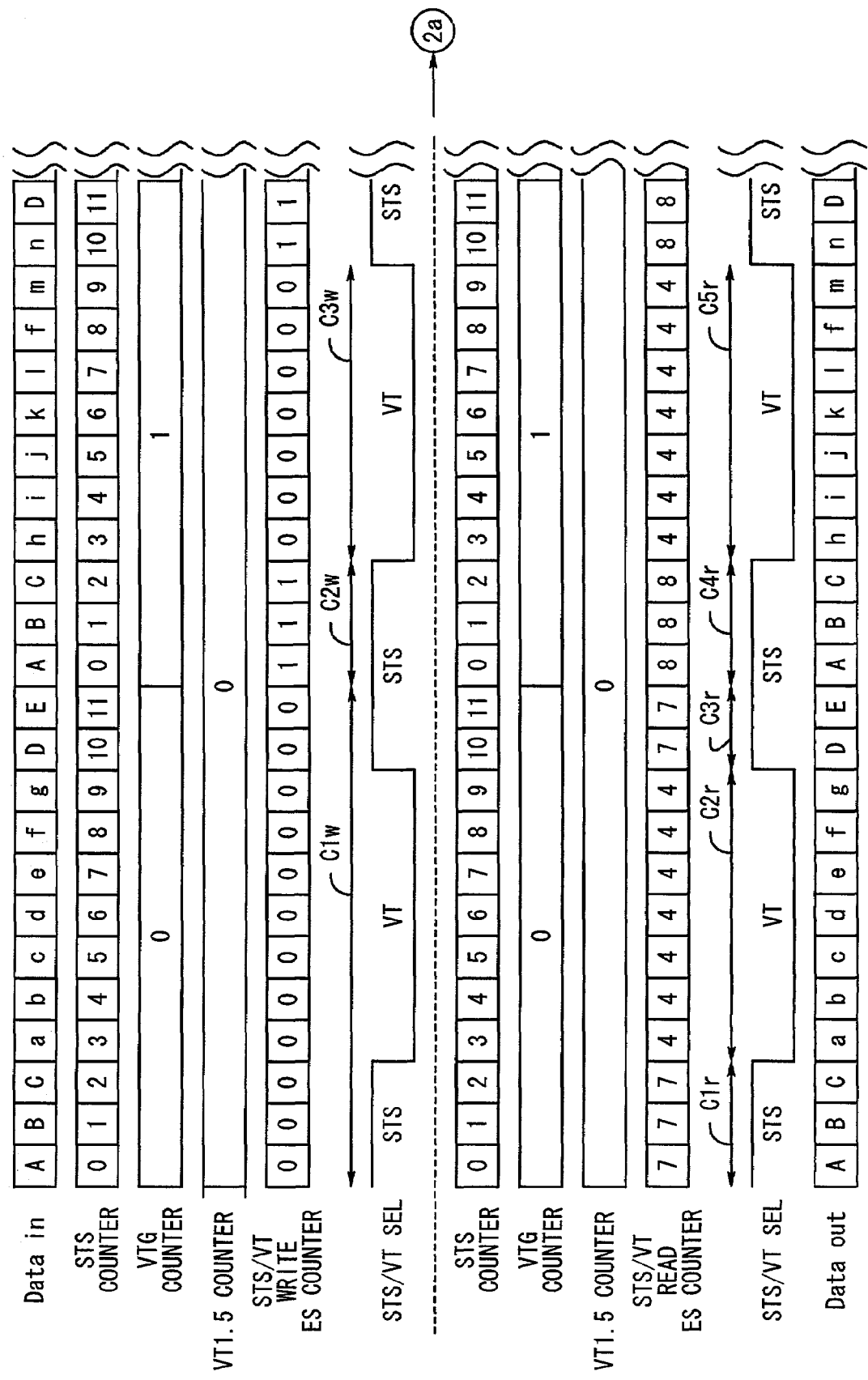
FIG. 8 is a timing chart of operations of a write counter and a read counter.
Figure 9:
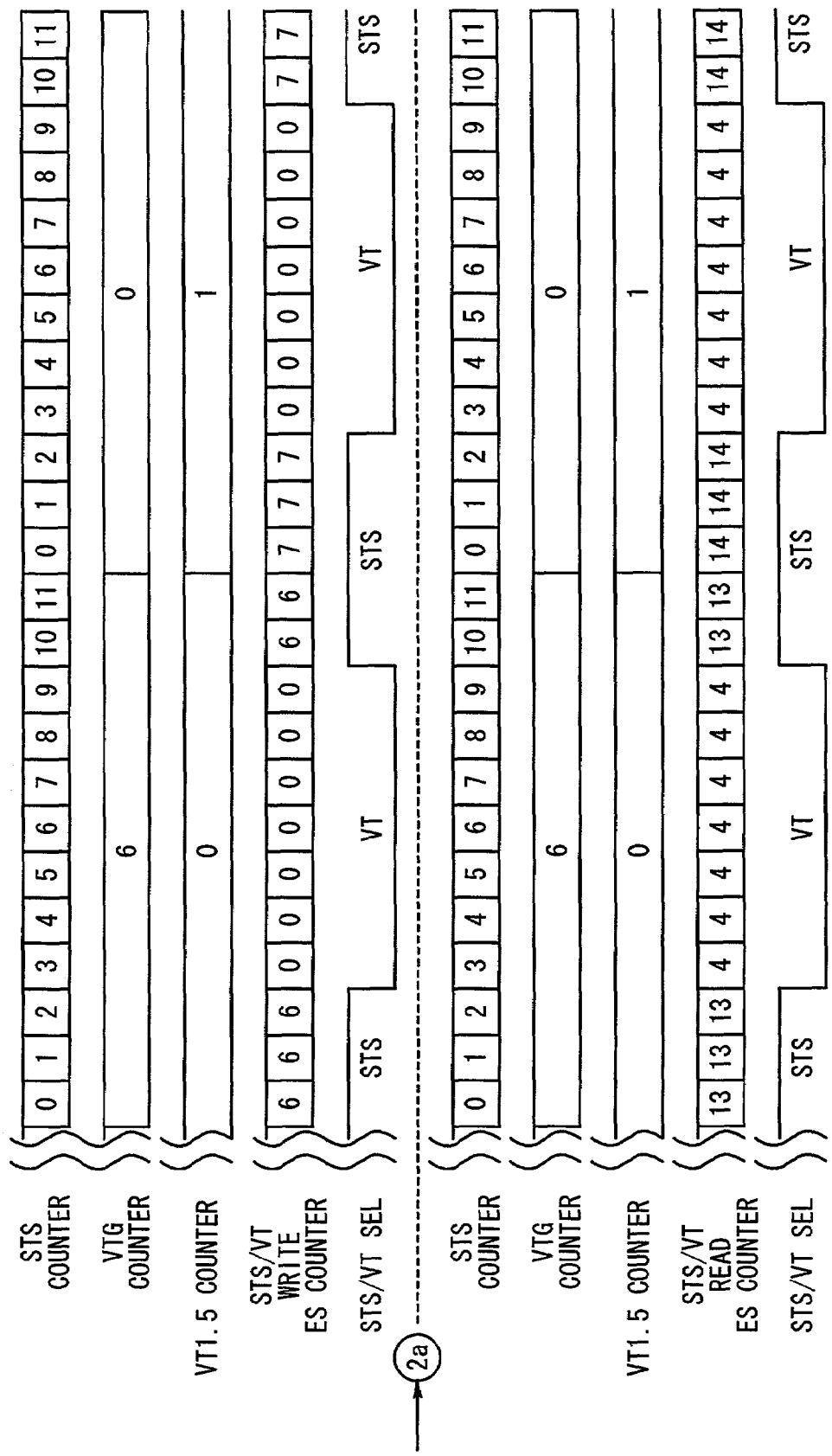
FIG. 9 is a timing chart of operations of the write counter and the read counter.

Next, a description will be given of the operations of the write counter 14 and the read counter 15 (STS/VT write ES counter 14a and the STS/VT read ES counter 15a). FIGS. 8 and 9 are timing charts showing the operations of the write counter 14 and the read counter 15. A part of each of FIGS. 8 and 9 upper a broken line shows the write operation of the STS/VT ES 13a (hereinafter simply referred to as ES 13a), and a part below the broken line shows the read operation thereof.

"Data in" and "Data out" in FIGS. 8 and 9 denote input data and output data with respect to the STS/VT ES 13a, respectively. The STS counter, VTG counter and VT1.5 counter have the respective count values in the aforementioned count control part 11.

A capital alphabet of "Data in" and "Data out" indicates an STS channel, and a lower-case alphabet indicates a VT channel. For example, an A channel is an STS channel and appears once among 12 channels. An a channel is a VT channel and appears once among 336 channels (=12×28).

The STS/VT write ES counter 14a performs a count process based on STS/VT SEL, and generates a write count value for ES 13a. The ES 13a is made up of a plurality of memories. The write count value of the STS/VT write ES counter 14a designates the address of the multiple stages of the memories that form the ES 13a. The values of the STS counter, VTG counter and VT1.5 counter (STS/VT count data) designate the address indicating the areas of the respective memories.

When the above is viewed in the timing charts on the write side of each figure, A-C channels, a-g channels, D and E channels are written into the zeroth-stage memory of ES 13a indicated by the STS/VT write ES counter 14a in section C1w. In section C2w, A–C channels are written into the first-stage memory of ES 13a. In section C3w , h-m channels are written into the zeroth-stage memory of ES 13a again.

That is, in STS channels, the stage of the memories in the ES 13a is changed every 12 channels. In VT channels, data is written into the memory in the ES 13a until 28×12 (=336).

In the timing charts on the read side of each figure, in section C1r, A–C channels are read from the seventh-stage memory of the ES 13a indicated by the STS/VT read ES counter 15a. In section C2r, a-g channels are read from the fourth-stage memory of the ES 13a.

In section C3r, D and E channels are read from the seventh-stage memory of the ES 13a indicated by the STS/VT read ES counter 15a. In section C4r, A–C channels are read from the eighth-stage memory of the ES 13a.

In section C5r, channels are read from the fourth-stage memory of the ES 13a again.

In the above-mentioned manner, the write/read control is performed, so that the ES 13a can be shared by processing of the STS signal and the VT signal efficiently. This makes it possible to downsize the circuit and reduce the power consumption.

Figure 10:
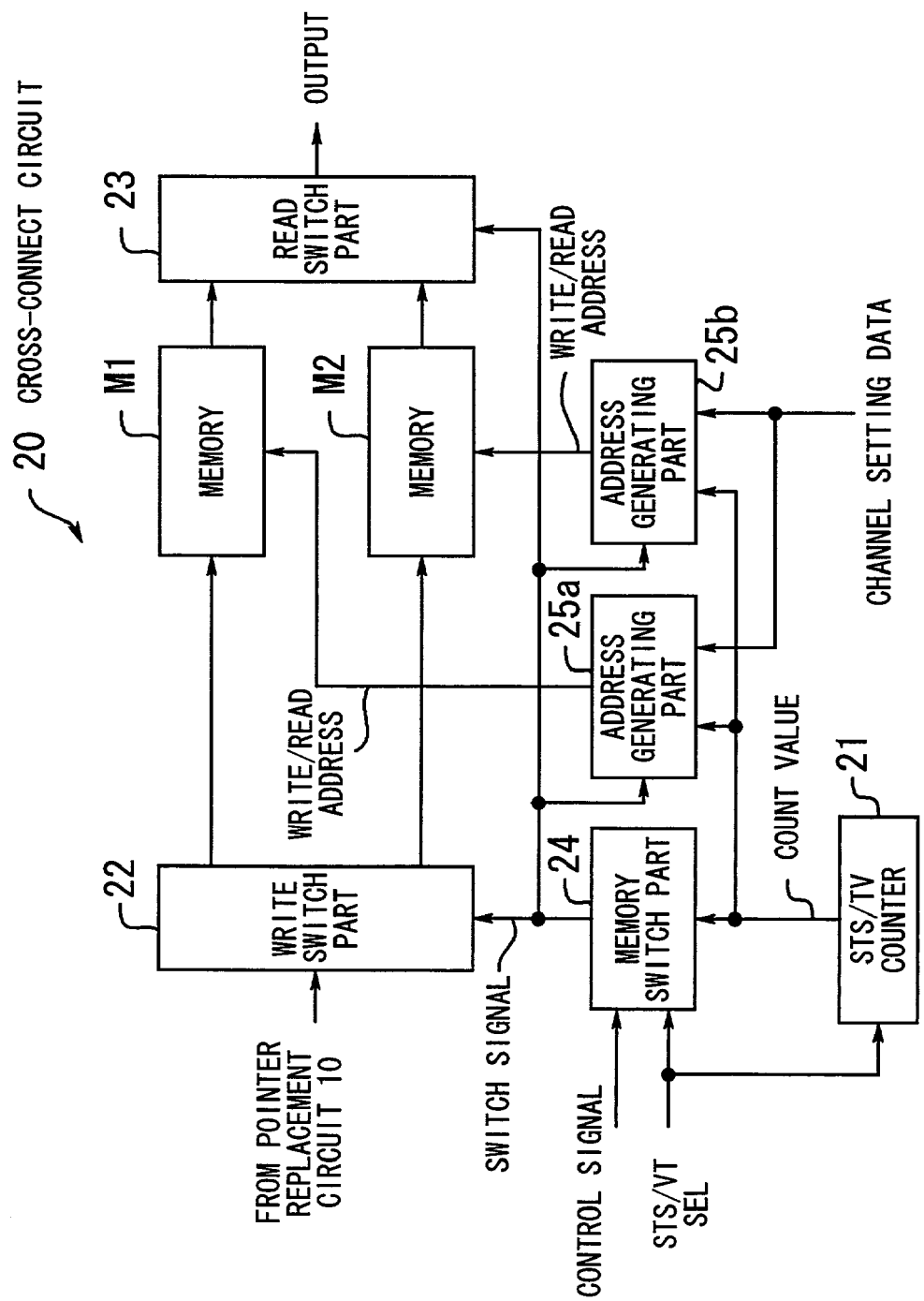
FIG. 10 is a block diagram of a configuration of a cross-connect circuit.

Next, the cross-connect circuit 20 is described. FIG. 10 is a block diagram of the cross-connect circuit 20. The cross-connect circuit 20 is made up of memories M1 and M2, an STS/VT counter 21, a write switch part 22, a read switch part 23, a memory switch part 24, address generating parts 25a and 25b. The memories M1 and M2, the write switch part 22 and the read switch part 23 correspond to the memory control part m.

The STS/VT counter 21 includes an STS counter (Write/Read) which counts STS channels, and a VT counter (Write/Read) which counts VT channels. The count values of these counters are sent to the memory switch part 24 and the address generating parts 25a and 25b. The STS/VT counter 21 has the same function as that of the count control part 11, and includes a new VT count function.

The memory switch part 24 generates a switch signal (memory switch information) for switching the memories M1 and M2 on the basis of the count value, STS/VT SEL and aforementioned control signals (VT SPE EN, STS plane switch, VT plane switch). The switch signal is then sent to the write switch part 22, the read switch part 23 and the address generating parts 25a and 25b.

The write switch part 22 outputs the signal sent by the pointer replacement circuit 10 to either the memory M1 or M2 on the basis of the switch signal. The read switch part 23 receives the signal from either the memory M1 or M2 on the basis of the switch signal.

For example, in a case where the memory M1 is arranged on the write side and the memory M2 is arranged on the read side, the write switch part 22 sends a signal to the memory M1, and the read switch part 23 receives a signal from the memory M2. In a case where the memory M1 is arranged on the read side and the memory M2 is arranged on the write side, the write switch part 22 sends a signal to the memory M2, and the read switch part 23 receives a signal from the memory M1 (one of the memories M1 and M2 is involved with read and the other is involved with write).

The address generating part 25a generates a write/read address of the memory M1 on the basis of the switch signal and the count value. The address generating part 25b generates a write/read address of the memory M2 on the basis of the switch signal and the count value.

The address generating parts 25a and 25b form a small-scale memory with the upper address equal to 0 in STS in a pseudo fashion. This prevents occurrence of a transmission delay that is not needed in writing/reading with respect to the memories M1 and M2 for making cross-connect. Channel setting data is used at the time of reading data from the memories M1 and M2 (which will be described later with reference to FIGS. 11 through 13).

Figure 11:
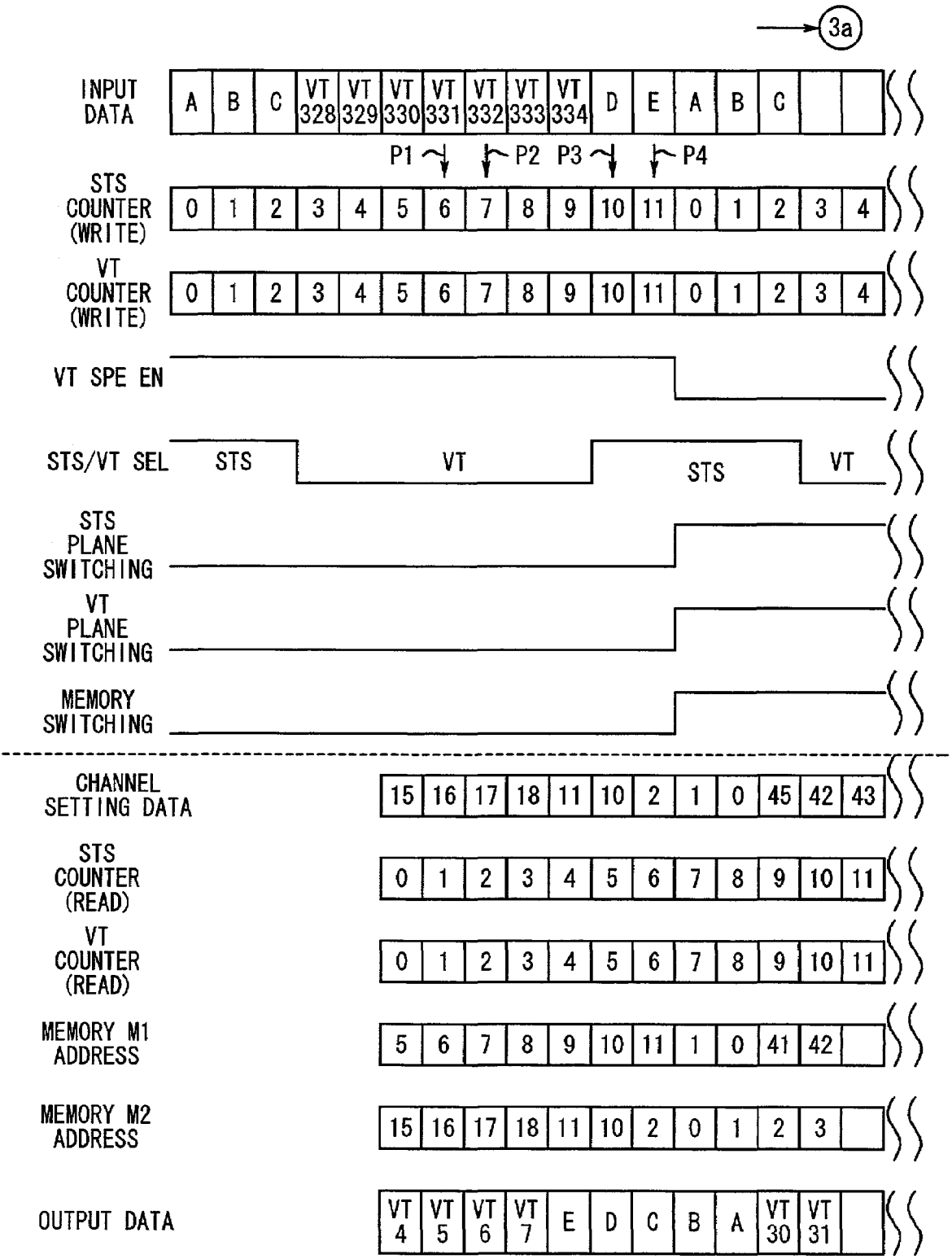
FIG. 11 is a timing chart of an operation of the cross-connect circuit.
Figure 12:
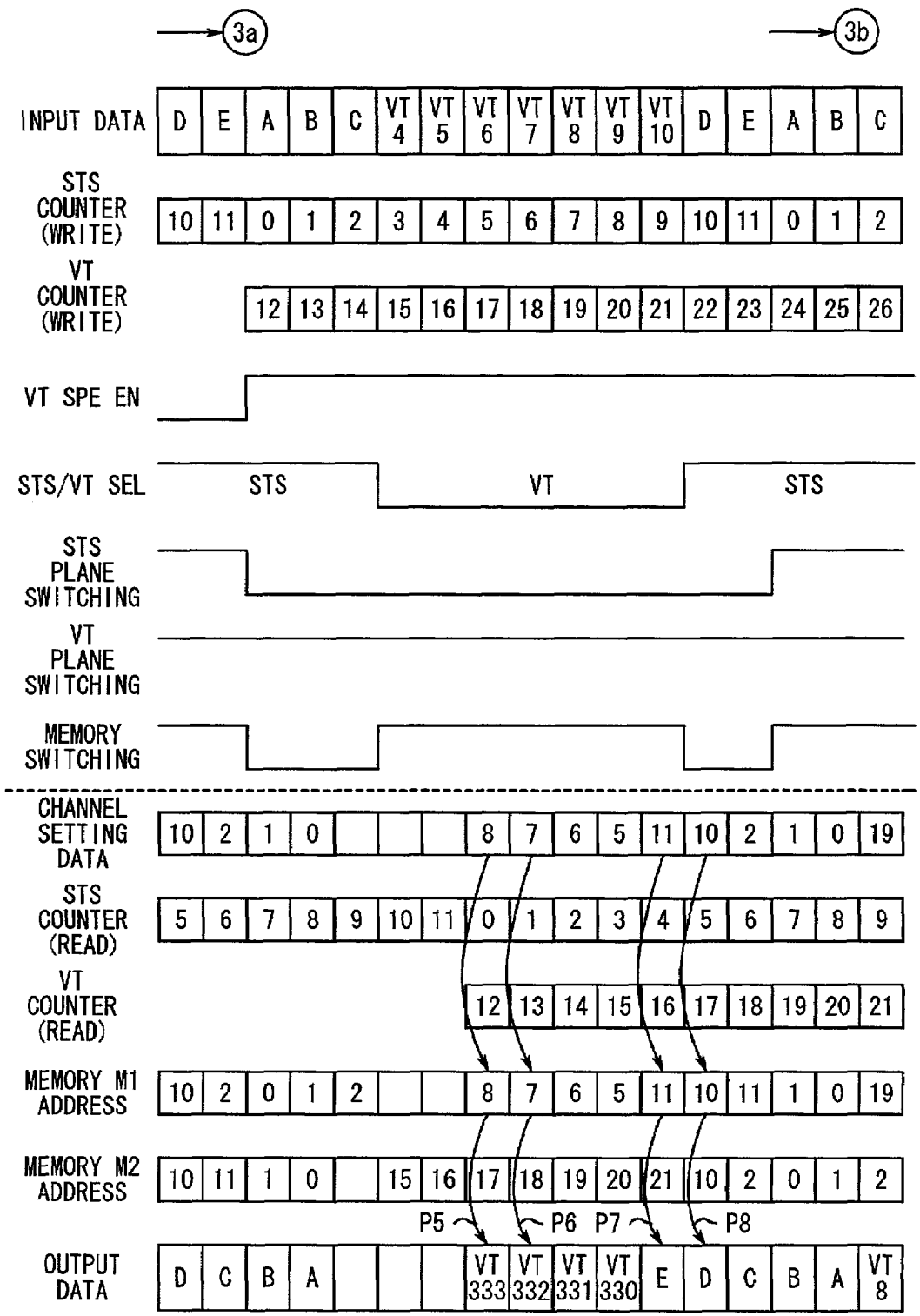
FIG. 12 is a timing chart of the operation of the cross-connect circuit.

FIGS. 11 through 13 are timing charts showing the operation of the cross-connect circuit 20. An upper part with respect to the dotted line shows writing data into the memories M1 and M2, and a lower part shows reading data therefrom.

"Input data" and "output data" shown in these figures respectively denote input data and output data with respect to the memories M1 and M2, and "STS counter" and "VT counter" are count values of the STS/VT counter 21 (there are a counter on the write side and a counter on the read side).

VT SPE EN is an enable signal of VT. The STS plane switch is on the 12-channel basis, and is used to write STS channels into the memory. The VT plane switching is made on the 12×28 channel basis, and is used to write VT channels into the memory. When the switch signal is "L", the memory M1 is involved with writing while the memory M2 is involved with reading. When the switch signal is "H", the memory M2 is involved with writing, the memory M1 being involved with reading.

Figure 14:
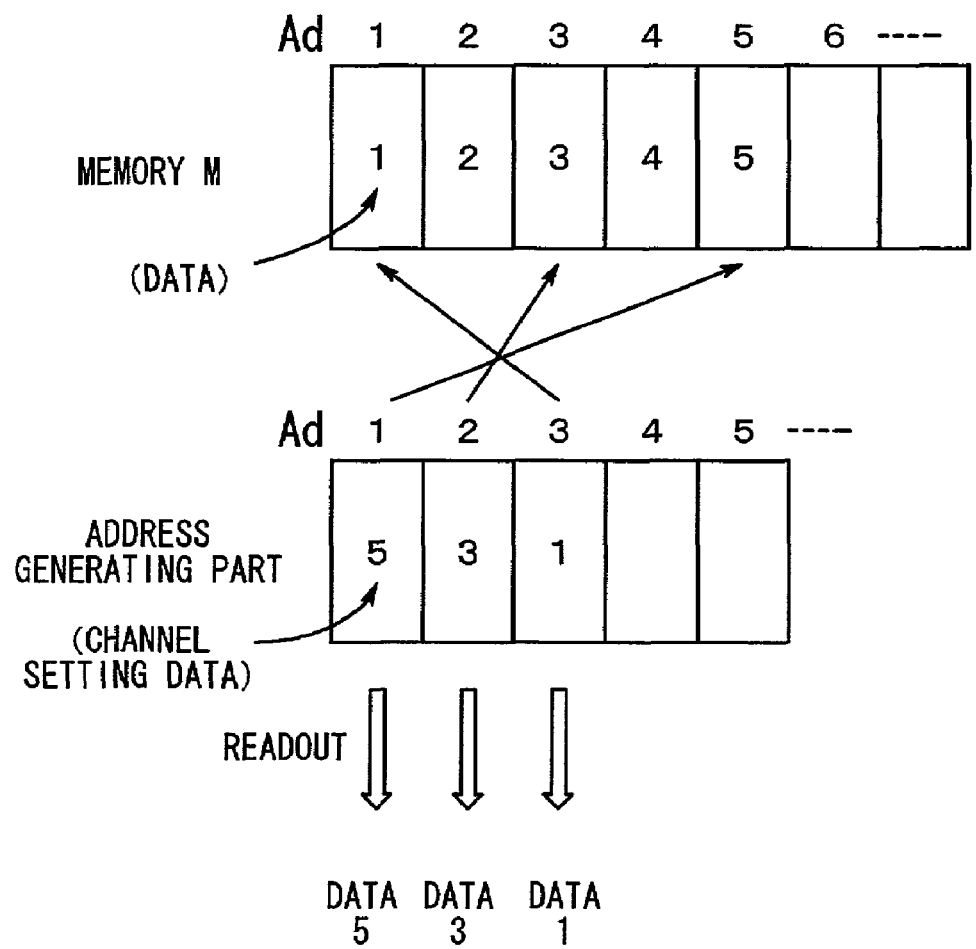
FIG. 14 is a view for describing channel setting data.

Here, channel setting data is described. FIG. 14 is a view that describes channel setting data. With respect to addresses Ad1–Ad5 of the memory M, data items 1–5 are stored, and channel setting data items 5, 3 and 1 are written into Ad1–Ad3 of the address generating part.

In that case, when address Ad1 of the address generating part is accessed, the value of channel setting data 5 of address Ad1 corresponds to the address Ad5 of the memory M, and data 5 stored therein is read out. Similarly, when the address Ad2 of the address generating part is accessed, the value of channel setting data 3 of the address Ad2 corresponds to the address Ad3 of the memory M, and data 3 stored therein is read out. When the address Ad3 of the address generating part is accessed, the value of channel setting data 1 of the address Ad3 corresponds to the address Ad1 of the memory M, and data 1 stored therein is read out. In this manner, channel setting data is information that designates the address of the memory M and the value of the read channel.

In the timing charts of FIGS. 11 through 13, on the write side, a VT channel 331 is written into address 6 by the VT counter (P1), and a VT channel 332 is written into address 7 by the VT counter (P2). An STS channel D is written into address 10 by the STS counter (P3), and an STS channel E is written into address 11 by the STS counter (P4).

On the read side, the VT channel 332 is read from address 7 by the channel setting data (P6), and a VT channel 333 is read from address 8 (P5). The STS channel D is read from address 10 by the channel setting data (P8), and an STS channel E is read from address 11 (P7).

Figure 15:
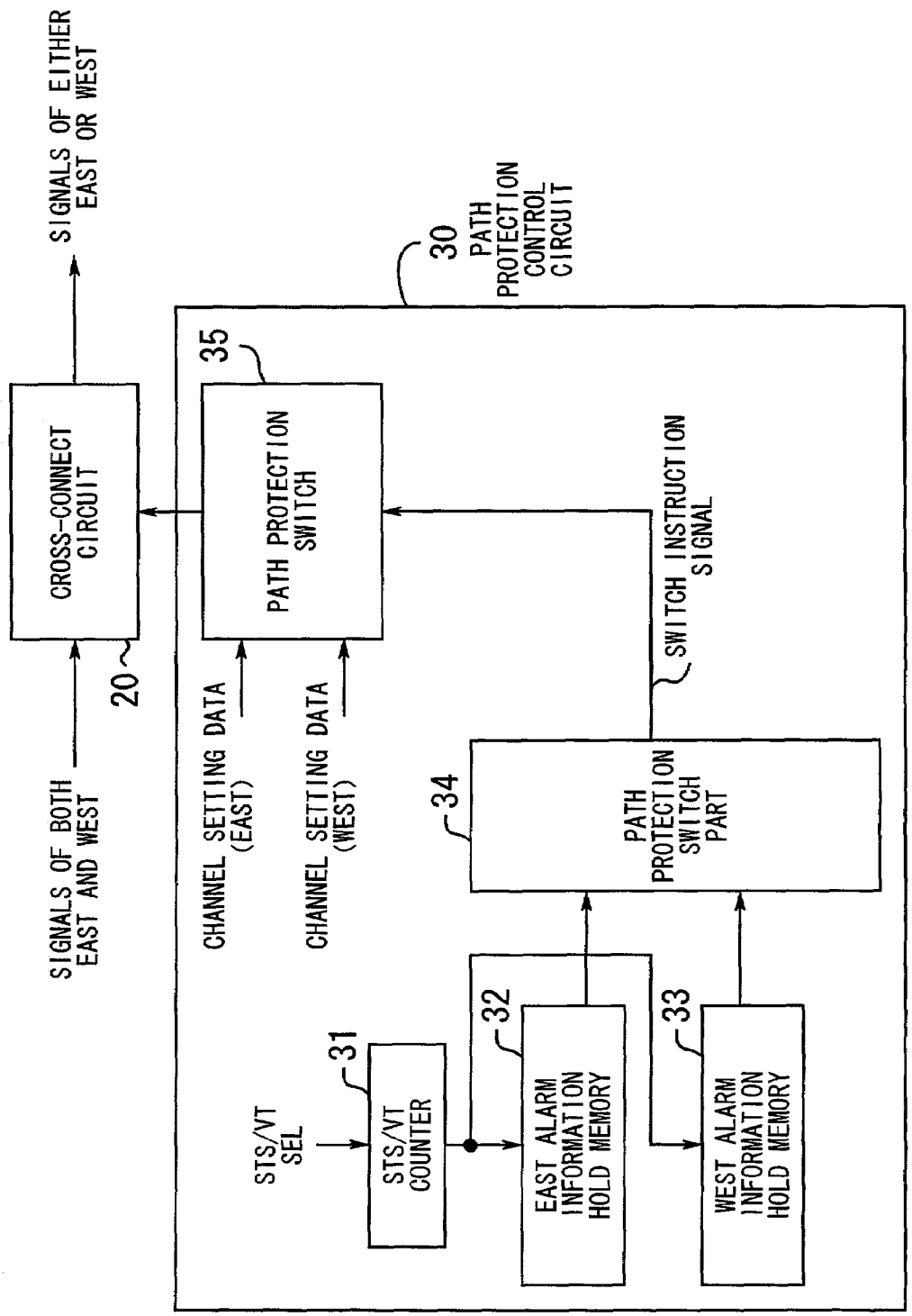
FIG. 15 is a block diagram of a configuration of a path protection control circuit.

Next, a description will be given of a path protection control circuit. FIG. 15 is a block diagram of a configuration of the path protection control circuit. A path protection control circuit 30 performs a path protection control when a line fault occurs in which the transmission device 1 is arranged in a node on a ring network. The path protection control circuit 30 is made up of an STS/VT counter 31, an east alarm information hold memory 32, a west alarm information hold memory 33, a path protection switch part 34, and a path protection switch 35.

The STS/VT counter 31 has an STS counter (read) that counts STS channels, and a VT counter (read) that counts VT channels. These count values are sent to the east alarm information hold memory 32 and the west alarm information hold memory 33. The STS/VT counter 31 corresponds to the count control part 11.

The east alarm information hold memory 32 holds alarm information concerning a line fault from the east, and outputs east alarm information by the count value from the STS/VT counter 31. The west alarm information hold memory 33 holds alarm information concerning a line fault from the west, and outputs west alarm information by the count value from the STS/VT counter 31.

The path protection switch part 34 selects either the east alarm information or the west alarm information, and outputs a switch instruction signal. The path protection switch 35 outputs either the east-side channel setting data or the west-side channel setting data to the cross-connect circuit 20 in response to the switch instruction signal.

The cross-connect circuit 20 is supplied with both the east and west signals, cross-connects and outputs the normal one of the east and west signals by the instruction from the path protection switch 35.

Figure 16:
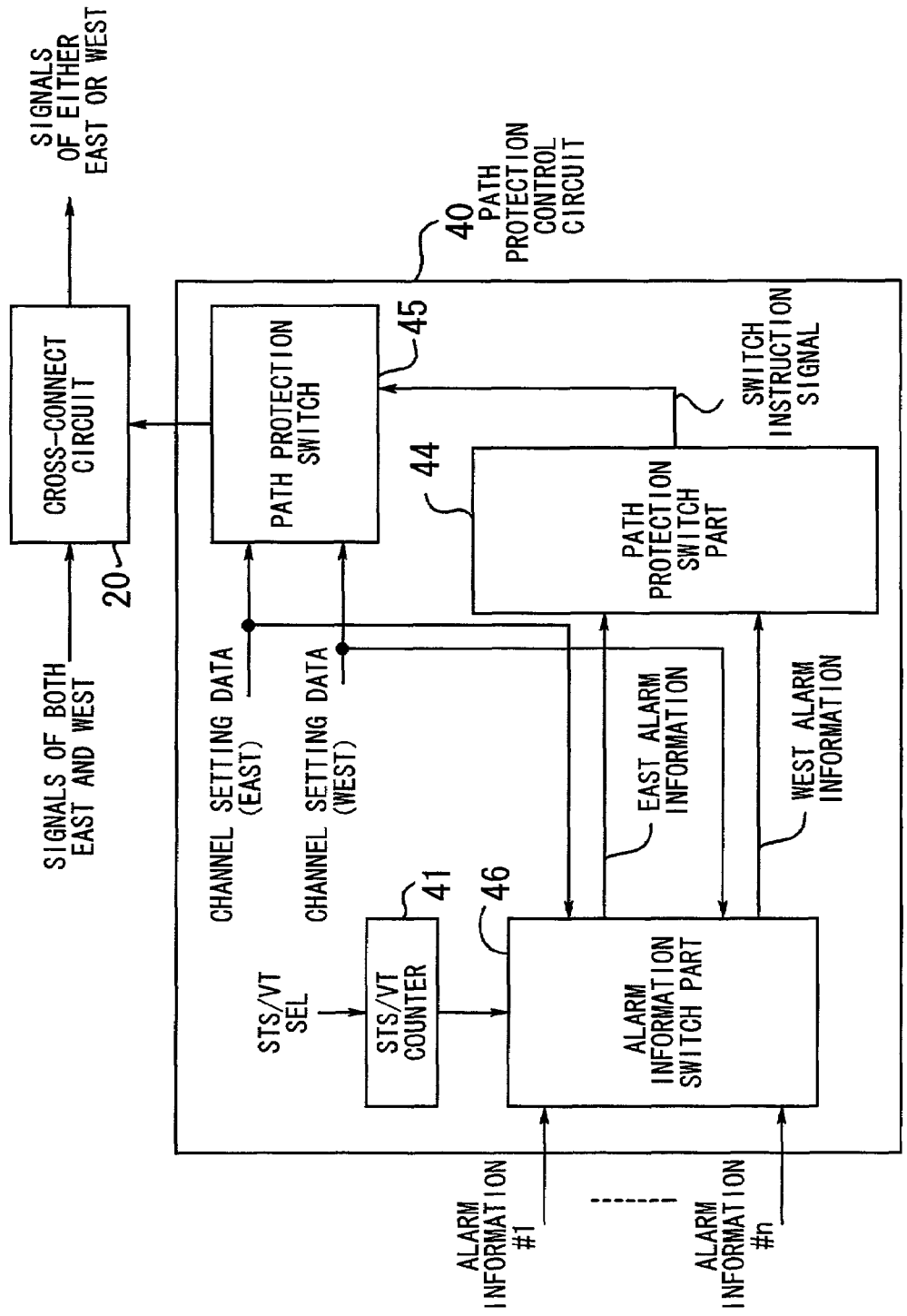
FIG. 16 is a block diagram of a variation of the path protection control circuit.
Figure 17:
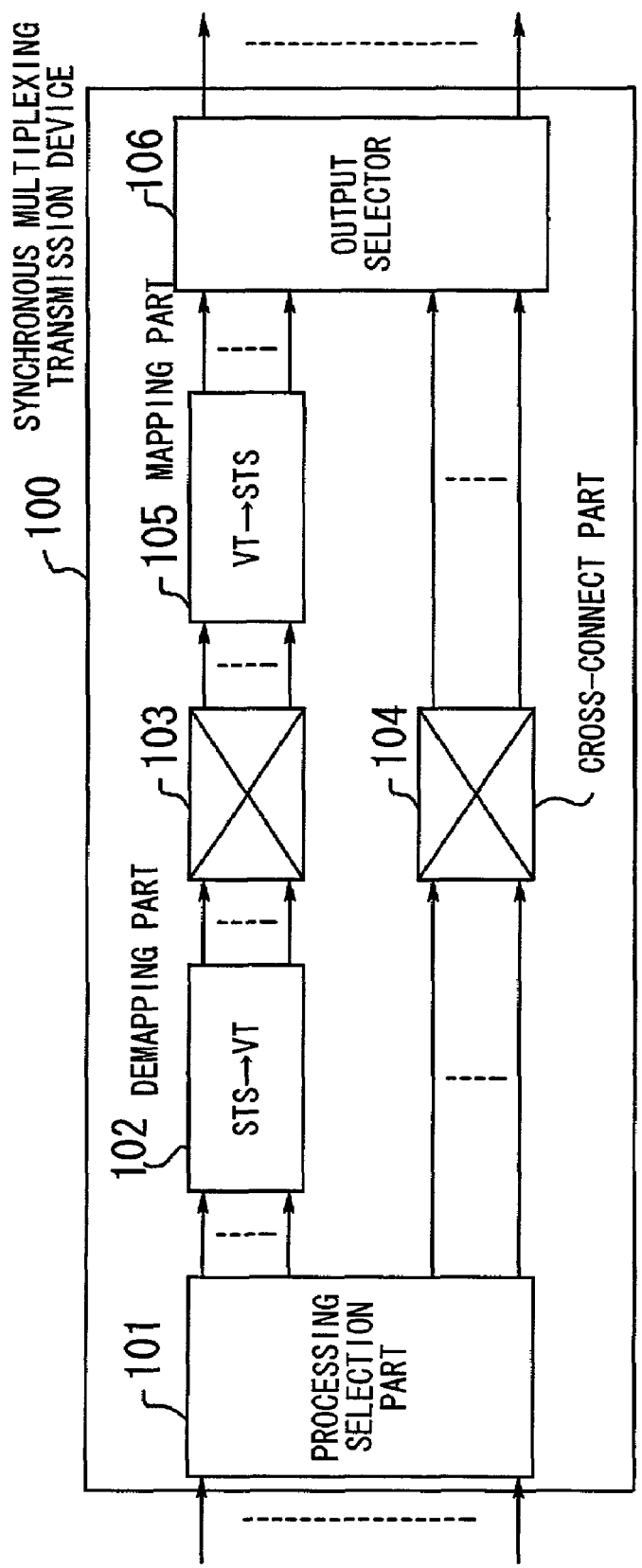
FIG. 17 is a schematic function block diagram of a conventional synchronous multiplexing transmission device.

FIG. 16 is a block diagram of a variation of the path protection control circuit 30. A path protection control circuit 40 is made up of an STS/VT counter 41, an alarm information switch part 46, a path protection switch part 44, and a path protection switch 45.

The alarm information switch part 46 receives the alarm information from the east and west, and performs switching of alarm information on the basis of the count value of the STS/VT counter 41 and channel setting data (east and west). Then, the alarm information switch part 46 outputs east alarm information and west alarm information.

The path protection switch part 44 selects either the east alarm information or the west alarm information and results in the switch instruction signal. The path protection switch 45 outputs either the channel setting data on the east side or the channel setting data on the west side to the cross-connect circuit 20 in the response to the switch instruction signal. The cross-connect circuit 20 is supplied with both the east and west signals, and cross-connects and outputs the normal one of the east and west signals by the instruction from the path protection switch 45.

As described above, the transmission device 1 of the present invention commonly uses the counters of channels of STS/VT signals and efficiently controls the processing circuits for the STS and VT signals in time division. It is therefore possible to down size the transmission device and reduce the consumption power.

As described above, the transmission device of the present invention commonly uses a count control of channels of a high-bit-rate multiplexing unit signal and those of a low-bit-rate multiplexing unit signal and performs a channel management control on the basis of specific information of the high-bit-rate multiplexing unit signal and the low-bit-rate multiplexing unit signal on a cross-connect basis for pointer replacement and control of cross-connect. Thus, it is possible to commonly use the STS and VT circuits and STM and TU circuits. This makes it possible to downsize the transmission device and reduce power consumed therein. This improves the transmission quality.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A SONET transmission control device performing a multiplexing transmission control comprising:
a pointer replacement circuit including a count control part generating a count value by performing a count control of STS/VT for SONET and performing a channel management control on the basis of specific information which indicates whether an STS or VT signal is to be selected for cross connection, a head position detecting part detecting a head position of path information based on a pointer value, a clock exchange memory part commonly using a storing area in the STS/VT, receiving a write/read control with respect to valid path information indicated by the head position and exchanging an input clock of the STS/VT for an output clock, a write counter generating a write count value corresponding to the input clock for the clock exchange part, a read counter generating a read count value corresponding to the output clock for the clock exchange memory part, and a pointer adding part adding a pointer of STS/VT to the valid path information read; and
a cross-connect circuit including a memory control part having a two-plane memory storing a signal with the pointer being added, a memory switch part generating memory switch information used for switching the planes of the memory on the basis of a count value, and an address generating part generating a write address and a read address of the memory on the basis of the count value.

2. The SONET transmission control device according to claim 1, wherein the write count value arid the read count value designate an address of a memory stage of the clock exchange memory part, and the count value by the count control part designates an address in an area in the memory.

3. The SONET transmission control device according to claim 1, further comprising a path protection control circuit including an alarm information storing memory commonly using a storing area and storing east alarm information received from the east and west alarm information receiving from the west in a ring network, and a path protection switch selecting channel setting data on the east or the west from the east alarm information or the west alarm information read in response to the count value from the count control part, and performing read control of the signal from the cross-connect circuit.

4. The SONET transmission control device according to claim 1, further comprising a phase comparator part comparing the count value of the write counter and the count value of the read counter with each other, and performing stuffing control on the basis of a count difference.

5. The count control part according to claim 1, comprising:
a counter indicating a fixed value when the specific information indicates the STS section and indicating a count value obtained at that time when the specific information indicates the VT section and separating the address zone into the address for STS channel management and the address for VT channel management by using the fixed value as an upper address.

6. A SDH transmission control device performing a multiplexing transmission control comprising:
a pointer replacement circuit including a count control part generating a count value by performing a count control of STM/TU for SDH and performing a channel management control on the basis of specific information which indicates whether an STM or TU signal is to be selected for cross connection, a head position detecting part detecting a head position of path information based on a pointer value, a clock exchange memory part commonly using a storing area in the STM/TU, receiving a write/read control with respect to valid path information indicated by the head position and exchanging an input clock of the STM/TU for an output clock, a write counter generating a write count value corresponding to the input clock for the clock exchange part, a read counter generating a read count value corresponding to the output clock for the clock exchange memory part, and a pointer adding part adding a pointer of STM/TU to the valid path information read; and a cross-connect circuit including a memory control part having a two-plane memory storing a signal with the pointer being added, a memory switch part generating memory switch information used for switching the planes of the memory on the basis of a count value, and an address generating part generating a write address and a read address of the memory on the basis of the count value.

7. The SDH transmission control device according to claim 6, wherein the write count value and the read count value designate an address of a memory stage of the clock exchange memory part, and the count value by the count control part designates an address in an area in the memory.

8. The SDH transmission control device according to claim 6, further comprising a path protection control circuit including an alarm information storing memory commonly using a storing area and storing east alarm information received from the east and west alarm information receiving from the west in a ring network, and a path protection switch selecting channel setting data on the east or the west from the east alarm information or the west alarm information road in response to the count value from the count control part, and performing read control or the signal from the cross-connect circuit.

9. The SDH transmission control device according to claim 6, further comprising a phase comparator part comparing the count value of the write counter and the count value of the read counter with each other, and performing stuffing control on the basis of a count difference.

10. The count control part according to claim 6, comprising:

a counter indicating a fixed value when the specific information indicates the STM section and indicating a count value obtained at that time when the specific information. indicates the TU section and separating the address zone into the address for STM channel management and the address for TU channel management by using the fixed value as an upper address.

* * * * *